United States Patent
Deng

(10) Patent No.: US 11,147,039 B2
(45) Date of Patent: Oct. 12, 2021

(54) PAGING STRATEGY DETERMINATION METHOD, DEVICE, RAN NETWORK ELEMENT AND CORE NETWORK ELEMENT

(71) Applicant: CHINA ACADEMY OF TELECOMMUNICATIONS TECHNOLOGY, Beijing (CN)

(72) Inventor: Qiang Deng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/968,131

(22) PCT Filed: Jan. 11, 2019

(86) PCT No.: PCT/CN2019/071314
§ 371 (c)(1),
(2) Date: Aug. 6, 2020

(87) PCT Pub. No.: WO2019/154011
PCT Pub. Date: Aug. 15, 2019

(65) Prior Publication Data
US 2021/0022112 A1    Jan. 21, 2021

(30) Foreign Application Priority Data

Feb. 8, 2018   (CN) .......................... 201810128517.7

(51) Int. Cl.
*H04W 68/02* (2009.01)
*H04W 76/22* (2018.01)
(Continued)

(52) U.S. Cl.
CPC ......... *H04W 68/02* (2013.01); *H04W 68/005* (2013.01); *H04W 72/042* (2013.01); *H04W 76/22* (2018.02); *H04W 76/27* (2018.02)

(58) Field of Classification Search
CPC ..... H04W 68/02; H04W 76/22; H04W 76/27; H04W 68/005; H04W 72/042
See application file for complete search history.

(56) References Cited

U.S. PATENT DOCUMENTS

| 8,180,388 B1 | 5/2012 | Ghaus et al. |
| 2012/0087313 A1 | 4/2012 | Yin et al. |

(Continued)

FOREIGN PATENT DOCUMENTS

| CN | 101360283 A | 2/2009 |
| CN | 101932040 A | 12/2010 |

(Continued)

OTHER PUBLICATIONS

3GPP, SA WG2 Meeting #123, S2-1777358, "Resolve EN on PPD", Oct. 2017.

(Continued)

*Primary Examiner* — Kyaw Z Soe
(74) *Attorney, Agent, or Firm* — Ladas & Parry, LLP

(57) ABSTRACT

The preset disclosure provides a paging strategy determination method, a device, a RAN network element and a core network element, the paging policy determination method includes: receiving a PPI value sent by a core network element, wherein the PPI value is determined according to the DSCP value of the downlink packet; and determining the paging policy according to the PPI value when the UE in the RRC deactivated state receives the downlink packet.

18 Claims, 5 Drawing Sheets

(51) Int. Cl.
*H04W 76/27* (2018.01)
*H04W 68/00* (2009.01)
*H04W 72/04* (2009.01)

(56) References Cited

U.S. PATENT DOCUMENTS

| | | | |
|---|---|---|---|
| 2013/0235855 | A1 | 9/2013 | Diachina et al. |
| 2014/0045492 | A1 | 2/2014 | Zakaria et al. |
| 2015/0063101 | A1 | 3/2015 | Touati et al. |
| 2016/0050140 | A1 | 2/2016 | Chinni et al. |
| 2016/0270026 | A1* | 9/2016 | Yin .................... H04W 76/00 |
| 2019/0082417 | A1* | 3/2019 | Bolle .................. H04W 88/14 |

FOREIGN PATENT DOCUMENTS

| | | | |
|---|---|---|---|
| CN | 103796176 | A | 5/2014 |
| CN | 105766022 | A | 7/2016 |
| CN | 107210966 | A | 9/2017 |

OTHER PUBLICATIONS

3GPP, SA WG2 Meeting #124, S2-178871, "TS 23.501 Clean-ups for RAN Paging Strategy Handling", Nov. 2017.
First Office Action in the Chinese application No. 201810128517.7, dated Mar. 26, 2020.
Written Opinion of the International Searching Authority in International application No. PCT/CN2019/071314, dated Mar. 28, 2019 with English translation provided by Google Translate.
International Search Report in the International application No. PCT/CN2019/071314, dated Mar. 28, 2019.
Extended European Search Report from EP app. No. 19751001.9, dated Feb. 24, 2021.
"RRC Inactive state notification support in TS 23.502", S2-175390, SA WG2 Meeting #122bis, Sofia Antipolis, France, Aug. 21-25, 2017.
"TS 23.501: Paging Priority considering RRC-inactive", S2-177521, SA WG2 Meeting #123, Ljubljana, Slovenia, Oct. 23-27, 2017.
3rd Generation Partnership Project; Technical Specification Group Services and System Aspects; System Architecture for the 5G System; Stage 2 (Release 15), 3GPP TS 23.501 V15.0.0, Dec. 2017.

* cited by examiner

PAGING STRATEGY DETERMINATION METHOD, DEVICE, RAN NETWORK ELEMENT AND CORE NETWORK ELEMENT

CROSS-REFERENCE TO RELATED APPLICATIONS

This application is the U.S. national phase of PCT Application No. PCT/CN2019/071314 filed on Jan. 11, 2019, which claims priority to Chinese Patent Application No. 201810128517.7 filed on Feb. 8, 2018, the disclosures of which are incorporated in their entireties by reference herein.

TECHNICAL FIELD

The present disclosure relates to the field of communication technology, in particular to a paging strategy determination method, a device, a RAN network element and a core network element.

BACKGROUND

In the current architecture of Fifth Generation Mobile Communication Technology system (5GS), a separation of control plane and user plane, and a separation of mobility management and session management are adopted. Specifically, Access and Mobility Management Function (AMF) entities and Session Management Function (SMF) entities are control plane network elements, the AMF entities are responsible for mobility management, the SMF entities are responsible for session management, User Plane Function (UPF) entities are user plane network elements.

In order to apply different paging policies for different services or traffic types, a paging policy differentiation feature has been defined in 5GS, which determines the paging policy based on the DSCP value in the IP packet header, such as paging retransmission mechanism.

When the User Equipment (UE) is idle, the paging policy differentiation mechanism is as follows: when the UPF entity receives a downlink packet, the UPF entity sends a notification message to the SMF entity, the notification message contains the Differentiated Services Code Point (DSCP) value of the downlink packet and a corresponding Quality of Service (QoS) flow identification QFI. After receiving the notification message, the SMF entity determines the Paging Policy Indication (PPI) value according to the DSCP value of the downlink packet, and sends the PPI value, Allocation and Retention Priority (ARP) and 5QI (associated with QFI) to the AMF entity through the N11 message, and the AMF entity determines the paging policy on the basis of the received information.

A Radio Resource Control (RRC) deactivated state of UE is defined in 5GS. When a UE is in the RRC deactivated state, the UE can release RRC connection and air interface Data Radio Bearer (DRB), but the network side maintains N2 and N3 connection. When the downlink data reaches the UPF entity, the UPF entity may directly send the downlink data to the Radio Access Network (RAN), and the RAN pages the UE in the RAN area; the UE, after responding to the paging, establishes a RRC connection and an air interface DRB, the downlink data is sent to the UE by the RAN.

Since the RAN does not parse IP packets, a paging policy differentiation mechanism based on QoS flow granularity is defined in the protocols for the UEs in RRC deactivated state. Specifically, SMF entities configure UPF entities to enable traffic with the same QoS but different paging requirements to be transmitted in different QoS flows, and the SMF entity indicates the PPI value corresponding to the QoS flow to the RAN through the N2 interface, so that when UE is in the RRC deactivated state, the RAN can determine the paging policy based on the PPI value, ARP and 5QI.

Although the PPI value can be determined according to characteristics of the QoS flow, so as to determine the corresponding paging policy when the UE is in the RRC deactivated state, different paging policies cannot be implemented according to the DSCP value of the downlink packet.

SUMMARY

The present disclosure provides a paging policy determination method, a device, a RAN network element and a core network element, for implementing different paging policies according to the DSCP value of the downlink packet when the UE is in the RRC deactivated state.

In a first aspect, the present disclosure provides a paging policy determination method applied to a RAN network element, the method including:
receiving a PPI value sent by a core network element, wherein the PPI value is determined according to the DSCP value of the downlink packet;
determining the paging policy according to the PPI value when the UE in the RRC deactivated state receives the downlink packet.

In a second aspect, the present disclosure provides a paging policy determination method applied to a core network element, the method including:
sending a PPI value to the RAN network element;
wherein the PPI value is determined according to the DSCP value of the downlink packet, so that the RAN network element determines the paging policy according to the PPI value when the UE in the RRC deactivated state receives the downlink packet.

In a third aspect, the present disclosure provides a RAN network element, including a transceiver interface, a memory, a processor and a program stored on the memory and capable of running on the processor;
the transceiver interface is configured to receive a PPI value sent by a core network element, wherein the PPI value is determined according to the DSCP value of the downlink packet;
the processor is configured to determine the paging policy according to the PPI value when the UE in the RRC deactivated state receives the downlink packet.

In a fourth aspect, the present disclosure provides a core network element, including a transceiver interface, a memory, a processor and a program stored on the memory and capable of running on the processor;
the transceiver interface is configured to send a PPI value to the RAN network element;
wherein the PPI value is determined according to the DSCP value of the downlink packet, so that the RAN network element determines the paging policy according to the PPI value when the UE in the RRC deactivated state receives the downlink packet.

In a fifth aspect, the present disclosure provides a paging policy determination device applied to a RAN network element, the paging policy determination device including:
a first receiving module for receiving a PPI value sent by a core network element, wherein the PPI value is determined according to the DSCP value of the downlink packet; and a first determination module for determining the paging policy according to the PPI value when the UE in the RRC deactivated state receives the downlink packet.

In a sixth aspect, the present disclosure provides a paging policy determination device applied to a core network element, the paging policy determination device including:

a first sending module sending a PPI value to the RAN network element:

wherein the PPI value is determined according to the DSCP value of the downlink packet, so that the RAN network element determines the paging policy according to the PPI value when the UE in the RRC deactivated state receives the downlink packet.

In a seventh aspect, the present disclosure provides a RAN network element, including a memory, a processor and a program stored on the memory and capable of running on the processor, wherein the program, when executed by the processor, performs the steps of the paging policy determination method applied to the RAN network element.

In an eighth aspect, the present disclosure provides a core network element, including a memory, a processor and a program stored on the memory and capable of running on the processor, wherein the program, when executed by the processor, performs the steps of the paging policy determination method applied to the core network element.

In a ninth aspect, the present disclosure provides a computer readable storage medium, wherein the computer readable storage medium stores thereon a computer program which, when executed by a processor, perform the steps of the paging policy determination method applied to the RAN network element.

In a tenth aspect, the present disclosure provides a computer readable storage medium, wherein the computer readable storage medium stores thereon a computer program which, when executed by a processor, perform the steps of the paging policy determination method applied to the core network element.

In the paging policy determination method according to the embodiments of the present disclosure, by receiving the PPI value sent by a core network element, the PPI value is determined according to the DSCP value of the downlink packet; the paging policy can be determined according to the PPI value when the UE in the RRC deactivated state receives the downlink packet. Since the PPI value can be determined according to the DSCP value of the downlink packet, different paging policies can be realized according to the DSCP value of the downlink packet when the UE is in the RRC deactivated state.

BRIEF DESCRIPTION OF THE DRAWINGS

In order to clearly illustrate the technical solutions of embodiments of the present disclosure, drawings required for description of the embodiments of the present disclosure will be briefly introduced below. Obviously, the drawings introduced below are merely some embodiments of the present disclosure, and other drawings may be obtained based on the drawings introduced below by those skilled in the art without any creative work.

DETAILED DESCRIPTION

The specific embodiments of the present disclosure may be further described hereinafter in details in conjunction with the drawings. Apparently the described embodiments are parts of but not all of the embodiments of the present disclosure. According to the embodiments of the present disclosure, all other embodiments obtained by those skilled in the art without creative efforts fall within the protective scope of the present disclosure.

Figure 1:
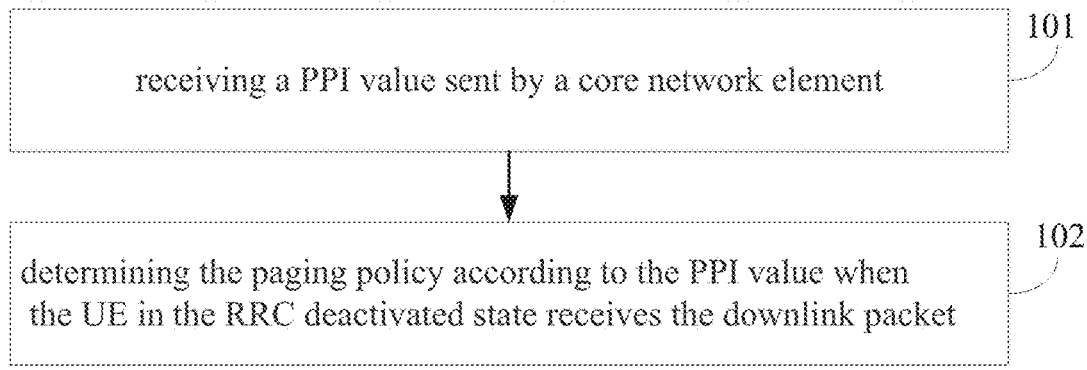
FIG. 1 is a flowchart of a paging policy determination method according to the embodiments of the present disclosure.

As shown in FIG. 1, the present disclosure provides a paging policy determination method applied to a RAN network element, the method includes steps 101 and 102.

Step 101: receiving a PPI value sent by a core network element.

The PPI value is determined according to the DSCP value of the downlink packet. The core network element may be a SMF entity or UPF entity, that is, the RAN network element may receive the PPI value sent by a SMF entity, or receive the PPI value sent by a UPF entity.

Step 102: determining the paging policy according to the PPI value when the UE in the RRC deactivated state receives the downlink packet.

Note that, while determining the paging policy, the RAN network element may determine the paging policy according to the PPI value, the ARP and 5QI associated with QFI.

In the paging policy determination method according to the embodiments of the present disclosure, by receiving the PPI value sent by a core network element, the PPI value is determined according to the DSCP value of the downlink packet; the paging policy can be determined according to the PPI value when the UE in the RRC deactivated state receives the downlink packet. Since the PPI value can be determined according to the DSCP value of the downlink packet, different paging policies can be realized according to the DSCP value of the downlink packet when the UE is in the RRC deactivated state.

According to the embodiments of the present disclosure, when the RAN network element receives the PPI value sent by the SMF entity, the PPI value may be determined by the SMF entity according to the DSCP value of the downlink packet received from the UPF entity, or the PPI value may be determined by the UPF entity according to the DSCP value of the downlink packet and sent to the SMF entity.

Further, when the PPI value is determined by the SMF entity according to the DSCP value of the downlink packet received from the UPF entity, the DSCP value may be sent by the UPF entity to the SMF entity after receiving a request message sent by the SMF entity. The request message is used to request the UPF entity to determine the DSCP value of the downlink packet and send the DSCP value of the downlink packet to the SMF entity, when the UPF entity detects the downlink packet after the Packet Data Unit (PDU) session is established. For example, the request message may be an event report request message, and the downlink packet may be the first downlink packet detected by the UPF entity.

Further, when receiving the PPI value, the RAN network element may receive the PPI value sent by the SMF entity through the AMF entity. Specifically, when the RAN network element receives the PPI value, it can receive N2 SM information sent by the AMF entity. The N2 SM information includes the PPI value which is sent by the SMF entity to the AMF entity, and the AMF entity does not parse the N2 SM information. Alternatively, when the RAN network element receives the PPI value, it can receive the N2 message sent by the AMF entity, the N2 message includes the PPI value which is sent by the SMF entity to the AMF entity through the N11 message.

In the embodiments of the present disclosure, when the RAN network element receives the PPI value sent by the UPF entity, the PPI value may be determined by the UPF entity according to the DSCP value of the downlink packet, or the PPI value may be determined by the SMF entity according to the DSCP value of the downlink packet received from the UPF entity and then sent to the UPF entity.

Further, when the RAN network element receives the PPI value sent by the UPF entity, it can receive the N3 tunnel header sent by the UPF entity, and the PPI value is contained in the N3 tunnel header.

Since the core network element does not know whether the UE will enter the RRC deactivated state, if the PPI value is sent to the RAN network element in all scenarios, signaling and resource waste will be caused. In order to avoid signaling and resource waste, the core network element may send the PPI value to the RAN network element on a condition that the RAN network element reports to the core network element that the UE enters the RRC deactivated state. Specifically, prior to the step 101, the method further includes:

the RAN network element receives a request message sent by the AMF entity; wherein, the request message is used to request the RAN network element to report to the AMF entity, when the UE enters the RRC deactivated state, that the UE enters the RRC deactivated state; the request message may be a status notification request message.

When the UE enters the RRC deactivated state, the RAN network element reports to the AMF entity that the UE enters the RRC deactivated state, and then the AMF entity reports to the SMF entity that the UE enters the RRC deactivated state.

Figure 2:
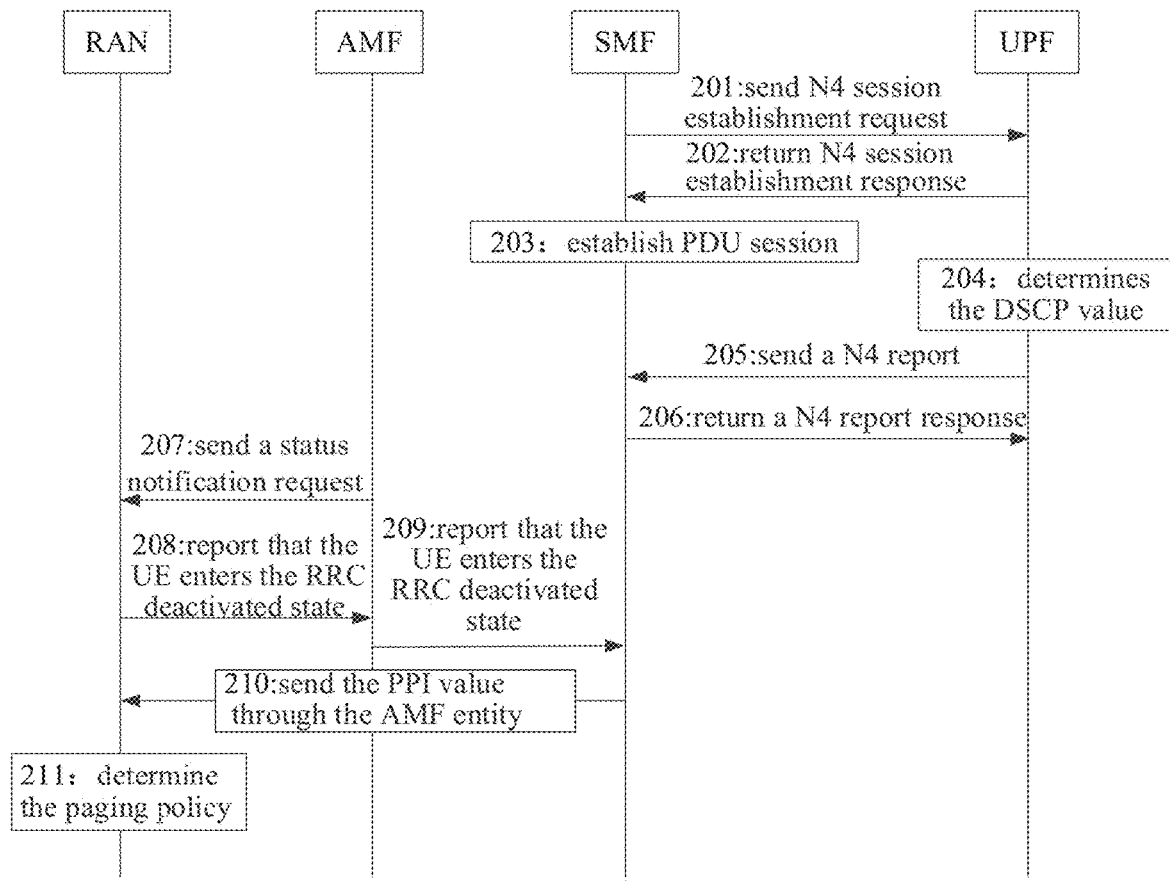
FIG. 2 is a flowchart showing the procedure of the paging policy determination method according to a first embodiment of the present disclosure.
Figure 3:
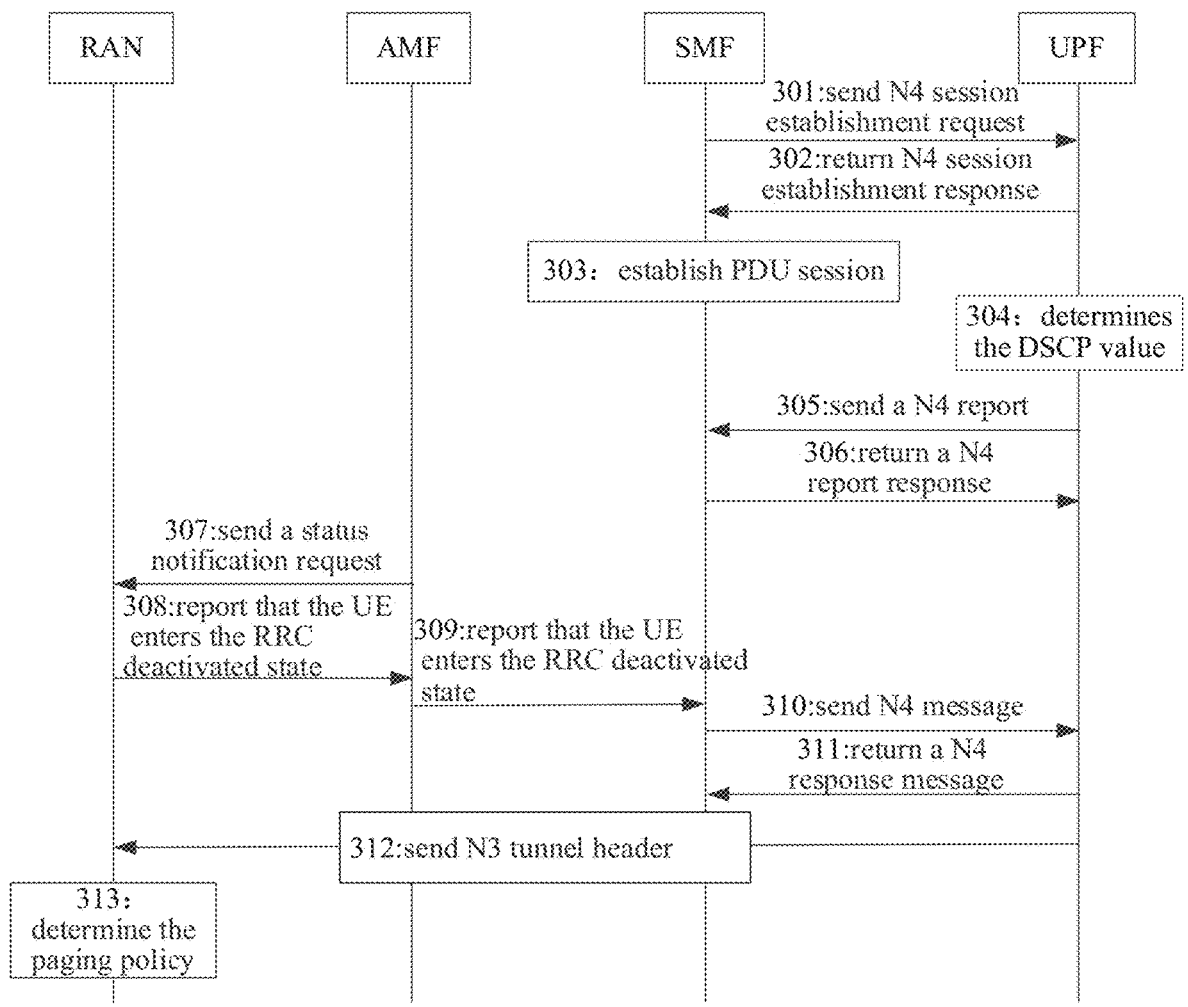
FIG. 3 is a flowchart showing the procedure of the paging policy determination method according to a second embodiment of the present disclosure.

Hereinafter, the procedures of the paging policy determination method according to the first and the second embodiments of the present disclosure will be described in conjunction with FIGS. 2 and 3, in which the case of PPI value sent by the SMF entity and the case of PPI value sent by the UPF entity are illustrated respectively.

First Embodiment

In the first embodiment, the SMF entity sends the PPI value to the RAN network element. As shown in FIG. 2, the paging policy determination method may include the following steps.

Step 201: after receiving a PDU session establishment request message or a request message for reselecting a UPF entity, the SMF entity sends an N4 session establishment request message to the UPF entity.

The N4 session establishment request message may include an event report request message for requesting the UPF entity to report the DSCP value of the downlink packet. Specifically, the event report request message is used for requesting the UPF entity to determine the DSCP value of the downlink packet when it detects the DSCP value of the downlink packet after completion of the PDU session establishment, and to send the DSCP value of the downlink packet to the SMF entity.

Step 202: the UPF entity returns an N4 session establishment response message to the SMF entity.

Step 203: the SMF entity interacts with other network elements that trigger this process, such as interacting with the AMF entity to complete the PDU session establishment process.

Step 204: when a downlink packet received after the establishment of a PDU session is detected, the UPF entity determines the DSCP value of the downlink packet; for example, the UPF entity may determine the DSCP value through the TOS (IPv4) and/or TC (IPv6) fields in the IP packet header; the downlink packet is the first downlink packet detected by the UPF entity.

Step 205: the UPF entity sends an N4 report message to the SMF entity; the N4 report message includes the DSCP value of the downlink packet and a corresponding QFI (QoS stream identification).

Step 206: the SMF entity determines the PPI value according to the DSCP value of the downlink packet, saves the PPI value in the UE context, and returns an N4 report response message to the UPF entity.

Step 207: when the UE is in the connected state, the AMF entity sends a status notification request message to the RAN network element, requesting the RAN network element to report to the AMF entity when the UE enters a RRC deactivated state.

Step 208: when the UE enters the RRC deactivated state, the RAN network element reports to the AMF entity that the UE enters the RRC deactivated state.

Step 209: the AMF entity reports to SMF entity that the UE enters the RRC deactivated state.

Step 210: the SMF entity sends the PPI value and the corresponding QFI to the RAN network element through the AMF entity, wherein the SMF entity may send the PPI value and QFI in the N2 SM information to the RAN network element through the AMF entity (AMF does not parse the N2 SM information); or, the SMF entity may send the PPI value and QFI to the AMF entity through the N11 message, and the AMF entity forwards the PPI value and QFI to the RAN network element through the N2 message.

Step 211: when the UE in the RRC active state receives the downlink packet, the RAN network element determines the paging policy based on the PPI value and the 5QI and ARP associated with QFI.

Second Embodiment

In the second embodiment, the UPF entity sends the PPI value to the RAN network element. As shown in FIG. 3, the paging policy determination method may include the following steps.

Step 301: after receiving a PDU session establishment request message or a request message for reselecting a UPF entity, the SMF entity sends an N4 session establishment request message to the UPF entity.

The N4 session establishment request message may include an event report request message for requesting the UPF entity to report the DSCP value of the downlink packet. Specifically, the event report request message is used for requesting the UPF entity to determine the DSCP value of the downlink packet when it detects the DSCP value of the downlink packet after completion of the PDU session establishment, and to send the DSCP value of the downlink packet to the SMF entity.

Step 302: the UPF entity returns an N4 session establishment response message to the SMF entity.

Step 303: the SMF entity interacts with other network elements that trigger this process, such as interacting with the AMF entity to complete the PDU session establishment process.

Step 304: when a downlink packet received after the establishment of a PDU session is detected, the UPF entity determines the DSCP value of the downlink packet; for example, the UPF entity may determine the DSCP value through the TOS (IPv4) and/or TC (IPv6) fields in the IP packet header; the downlink packet is the first downlink packet detected by the UPF entity.

Step 305: the UPF entity sends an N4 report message to the SMF entity; the N4 report message includes the DSCP value of the downlink packet and a corresponding QFI.

Step 306: the SMF entity determines the PPI value according to the DSCP value of the downlink packet, saves the PPI value in the UE context, and returns an N4 report response message to the UPF entity.

Step 307: when the UE is in the connected state, the AMF entity sends a status notification request message to the RAN network element, requesting the RAN network element to report to the AMF entity when the UE enters a RRC deactivated state.

Step 308: when the UE enters the RRC deactivated state, the RAN network element reports to the AMF entity that the UE enters the RRC deactivated state.

Step 309: the AMF entity reports to SMF entity that the UE enters the RRC deactivated state.

Step 310: the SMF entity sends the N4 message to the UPF entity, the N4 message includes the PPI value and a corresponding QFI.

Step 311: the UPF entity returns a N4 response message to the SMF entity.

Step 312: the UPF entity adds the PPI value into the N3 tunnel header and sends the N3 tunnel header to the RAN network element.

Step 313: when the UE in the RRC active state receives the downlink packet, the RAN network element determines the paging policy based on the PPI value in the N3 tunnel header and the 5QI and ARP associated with the QFI.

In this way, by using either the control plane scheme or the user plane scheme, the PPI value for determining the paging policy can be provided to the RAN.

Figure 4:
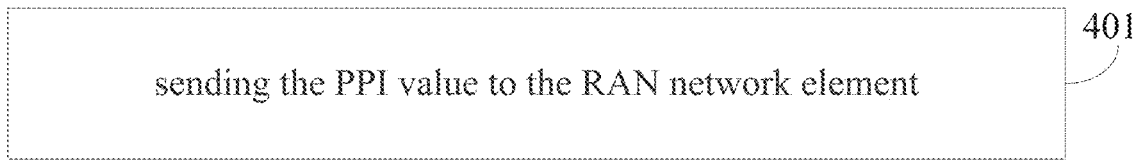
FIG. 4 is a flowchart of another paging policy determination method according to the embodiments of the present disclosure.

As shown in FIG. 4, the present disclosure further provides a paging policy determination method applied to a core network element, the method includes:

Step 401, sending the PPI value to the RAN network element;

wherein the PPI value is determined according to the DSCP value of the downlink packet, such that the RAN network element can determine the paging policy according to the PPI value when the UE in the RRC deactivated state receives the downlink packet.

In the paging policy determination method according to the embodiments of the present disclosure, by receiving the PPI value sent by a core network element, the PPI value is determined according to the DSCP value of the downlink packet; the paging policy can be determined according to the PPI value when the UE in the RRC deactivated state receives the downlink packet. Since the PPI value can be determined according to the DSCP value of the downlink packet, different paging policies can be realized according to the DSCP value of the downlink packet when the UE is in the RRC deactivated state.

According to the embodiments of the present disclosure, the core network element may be the SMF entity. The method further includes the following steps before Step 401:

receiving the DSCP value of the downlink packet sent by the UPF entity;

determining the PPI value according to the DSCP value of the downlink packet.

Optionally, before receiving the DSCP value of the downlink packet sent by the UPF entity, the method further includes:

sending a PPI value to the UPF entity;

the request message is used to request the UPF entity to send the DSCP value of the downlink packet to the SMF entity.

Optionally, the request message is used to request the UPF entity to determine the DSCP value of the downlink packet and send the DSCP value of the downlink packet to the SMF entity, when the UPF entity detects the downlink packet after the PDU session is established.

According to the embodiments of the present disclosure, the core network element may be the SMF entity. The method further includes the following steps before Step 401:

receiving the PPI value sent by the UPF entity;

wherein the PPI value is determined by the UPF entity according to the DSCP value of the downlink packet.

Optionally, the sending a PPI value to the RAN network element, includes:

sending the PPI value to the RAN network element through an AMF entity.

Optionally, the sending the PPI value to the RAN network element through an AMF entity, includes:

sending the N2 SM information to the AMF entity, and forwarding the N2 SM information to the RAN network element by the AMF entity;

wherein, the N2 SM information includes the PPI value.

Optionally, the sending the PPI value to the RAN network element through an AMF entity, includes:

sending a N11 message to the AMF entity;

wherein the N11 message includes the PPI value, so that the AMF entity sends the PPI value to the RAN network element through the N2 message.

According to the embodiments of the disclosure, the core network element may be a UPF entity, and before Step 401, the method further includes:

receiving the PMI value sent by the SMF entity;

wherein the PPI value is determined by the SMF entity according to the DSCP value of the downlink packet received from the UPF entity.

Optionally, the sending the PPI value to the RAN network element, includes:

adding the PPI value to the N3 tunnel header;

sending the N3 tunnel header to the RAN network element.

The above embodiments are provided for explaining the paging policy determination method of the present disclosure, and the RAN network element and the core network element of the present disclosure will be described in combination with the following embodiments and the accompanying drawings.

Figure 5:
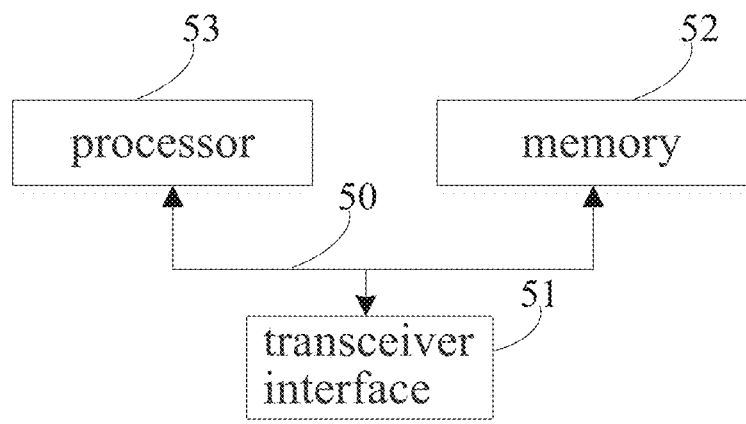
FIG. 5 is a schematic structural view of the RAN network element according to the embodiments of the present disclosure.

As shown in FIG. 5, the present disclosure provides a RAN network element, including a transceiver interface 51, a memory 52, a processor 53 and a program stored on the memory 52 and capable of running on the processor 53;

the transceiver interface 51 is configured to receive a PPI value sent by a core network element, wherein the PPI value is determined according to the DSCP value of the downlink packet;

the processor 53 is configured to determine the paging policy according to the PPI value when the UE in the RRC deactivated state receives the downlink packet.

In the RAN network element of the present disclosure, by receiving the PPI value sent by a core network element, the PPI value is determined according to the DSCP value of the downlink packet; the paging policy can be determined according to the PPI value when the UE in the RRC deactivated state receives the downlink packet, thereby different paging policies can be realized according to the DSCP value of the downlink packet when the UE is in the RRC deactivated state.

Optionally, the transceiver interface 51 is configured to receive a PPI value sent by the SMF entity;

wherein the PPI value is determined by the SMF entity according to the DSCP value of the downlink packet received from the UPF entity.

Optionally, the DSCP value may be sent the UPF entity to the SMF entity after receiving a request message sent by the SMF entity.

Optionally, the request message is used to request the UPF entity to determine the DSCP value of the downlink packet and send the DSCP value of the downlink packet to the SMF entity, when the UPF entity detects the downlink packet after the PDU session is established.

Optionally, the transceiver interface 51 is configured to receive a PPI value sent by the SMF entity;

wherein the PPI value is determined by the UPF entity according to the DSCP value of the downlink packet and sent to the SMF entity.

Optionally, the transceiver interface 51 is configured to receive the PPI value sent by the SMF entity through the AMF entity.

Optionally, the transceiver interface 51 is configured to receive N2 SM information sent by the AMF entity. The PPI value is included in the N2 SM information which is sent by the SMF entity to the AMF entity.

Optionally, the transceiver interface 51 is configured to receive the N2 message sent by the AMF entity, wherein the N2 message includes the PPI value which is sent by the SMF entity to the AMF entity through the N11 message.

Optionally, the transceiver interface 51 is configured to receive the PPI value sent by the UPF entity, wherein the PPI value may be determined by the UPF entity according to the DSCP value of the downlink packet, or the PPI value may be determined by the SMF entity according to the DSCP value of the downlink packet received from the UPF entity and then sent to the UPF entity.

Optionally, the transceiver interface 51 is configured to receive the N3 tunnel header sent by the UPF entity, wherein the PPI value is contained in the N3 tunnel header.

Optionally, the transceiver interface 51 is configured to receive a request message sent by the AMF entity, wherein the request message is used to request the RAN network element to report to the AMF entity, when the UE enters the RRC deactivated state, that the UE enters the RRC deactivated state.

The processor 53 is configured to report to the AMF entity that the UE enters the RRC deactivated state when the UE enters the RRC deactivated state, and then the AMF entity reports to the SMF entity that the UE enters the RRC deactivated state.

In FIG. 5, the bus architecture (represented by Bus 50) may include any number of interconnected buses and bridges. The Bus 50 connects various circuits including one or more processors represented by e processor 53 and memories represented by the memory 52. The transceiver interface 51 may include two interfaces, the sending interface and the receiving interface, or it can be one interface. The transceiver interface 51 may be connected to the processor 53 and the memory 52 through the Bus 50.

The processor 53 is configured for managing the Bus 50 and normal processing while the memory 52 may be used to store data for performing the operations by the processor 53.

Figure 6:
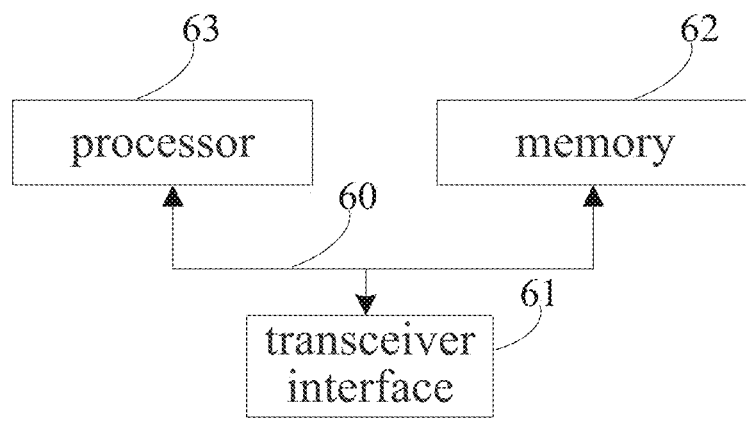
FIG. 6 is a schematic structural view of the core network element according to the embodiments of the present disclosure.

As shown in FIG. 6, the present disclosure provides a core network element, including a transceiver interface 61, a memory 62, a processor 63 and a program stored on the memory 62 and capable of running on the processor 63;

the transceiver interface 61 is configured to send the PPI value to the RAN network element;

wherein the PPI value is determined according to the DSCP value of the downlink packet, so that the RAN network element determines the paging policy according to the PPI value when the UE in the RRC deactivated state receives the downlink packet.

In the core network element according to the embodiments of the present disclosure, by sending the PPI value to the RAN network element, the PPI value is determined according to the DSCP value of the downlink packet; the paging policy can be determined according to the PPI value when the UE in the RRC deactivated state receives the downlink packet, therefore different paging policies can be realized according to the DSCP value of the downlink packet when the UE is in the RRC deactivated state.

Optionally, the core network element is the SMF entity; the transceiver interface 61 is configured to receive the DSCP value of the downlink packet sent by the UPF entity;

the processor 63 is configured to determine the PPI value according to the DSCP value of the downlink packet.

Optionally, the transceiver interface 61 is configured to send a request message to the UPF entity;

the request message is used to request the UPF entity to send the DSCP value of the downlink packet to the SMF entity.

Optionally, the request message is used to request the UPF entity to determine the DSCP value of the downlink packet and send the DSCP value of the downlink packet to the SMF entity, when the UPF entity detects the downlink packet after the PDU session is established.

Optionally, the core network element is the SMF entity; the transceiver interface 61 is configured to receive a PPI value sent by the SMF entity;

wherein the PPI value is determined by the UPF entity according to the DSCP value of the downlink packet.

Optionally, the transceiver interface 61 is configured to send the PPI value to the RAN network element through the AMF entity.

Optionally, the transceiver interface 61 is configured to send N2 SM information to the AMF entity, so that the AMF entity forwards the N2 SM information to the RAN network element.

The N2 SM information includes the PPI value.

Optionally, the transceiver interface 61 is configured to send the N11 message to the AMF entity;

wherein the N11 message includes the PPI value, such that the AMF entity sends the PPI value to the RAN network element through the N2 message.

Optionally, the core network element is an UPF entity, the transceiver interface 61 is configured to receive a PPI value sent by the SMF entity;

wherein the PPI value is determined by the SMF entity according to the DSCP value of the downlink packet received from the UPF entity.

Optionally, the processor 63 is configured to add the PPI value into the N3 tunnel header;

the transceiver interface 61 is configured to send the N3 tunnel header to the RAN network element.

In FIG. 6, the bus architecture (represented by Bus 60) may include any number of interconnected buses and bridges. The Bus 60 connects various circuits including one or more processors represented by the processor 63 and memories represented by the memory 62. The transceiver interface 61 may include two interfaces, the sending interface and the receiving interface, or it can be one interface. The transceiver interface 61 may be connected to the processor 63 and the memory 62 through the Bus 60.

The processor 63 is configured for managing the Bus 60 and normal processing while the memory 62 may be used to store data for performing the operations by the processor 63.

Figure 7:
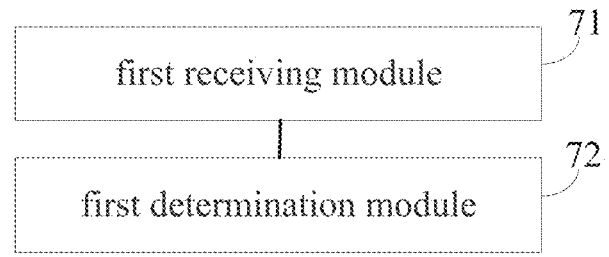
FIG. 7 is a schematic structural view of a paging policy determination device according to the embodiments of the present disclosure.

As shown in FIG. 7, the present disclosure provides a paging policy determination device applied to a RAN network element, the paging policy determination device includes:

a first receiving module 71 for receiving a PPI value sent by a core network element, wherein the PPI value is determined according to the DSCP value of the downlink packet; and a first determination module 72 for determining the paging policy according to the PPI value when the UE in the RRC deactivated state receives the downlink packet.

In the paging policy determination device according to the embodiments of the present disclosure, by receiving the PPI value sent by a core network element, the PPI value is determined according to the DSCP value of the downlink packet; the paging policy can be determined according to the PPI value when the UE in the RRC deactivated state receives the downlink packet, thereby different paging policies can be realized according to the DSCP value of the downlink packet when the UE is in the RRC deactivated state.

Specifically, the first receiving module 71 is configured to receive the PPI value sent by the SMF entity; wherein PPI value may be determined by the SMF entity according to the DSCP value of the downlink packet received from the user plane function UPF entity, or the PPI value may be determined by the UPF entity according to the DSCP value of the downlink packet and sent to the SMF entity.

Optionally, the DSCP value is sent by the UPF entity to the SMF entity after receiving a request message sent by the SMF entity.

Optionally, the request message is used to request the UPF entity to determine the DSCP value of the downlink packet and send the DSCP value of the downlink packet to the SMF entity, when the UPF entity detects the downlink packet after the PDU session is established.

Specifically, the first receiving module 71 is configured to receive the PPI value sent by the SMF entity through the AMF entity.

Optionally, the first receiving module 71 is configured to receive N2 SM information sent by the AMF entity, wherein the N2 SM information includes the PPI value which is sent by the SMF entity to the AMF entity.

Optionally, the first receiving module 71 is configured to receive the N2 message sent by the AMF entity, wherein the N2 message includes the PPI value which is sent by the SMF entity to the AMF entity through the N11 message.

Optionally, the first receiving module 71 is configured to receive the PPI value sent by the UPF entity, wherein the PPI value is determined by the UPF entity according to the DSCP value of the downlink packet, or the PPI value is determined by the SMF entity according to the DSCP value of the downlink packet received from the UPF entity and then sent to the UPF entity.

Optionally, the first receiving module 71 is configured to receive the N3 tunnel header sent by the UPF entity, and the PPI value is contained in the N3 tunnel header.

Optionally, the device further includes:

a second receiving module for receiving a request message sent by the AMF entity; wherein, the request message is used to request the RAN network element to report to the AMF entity, when the UE enters the RRC deactivated state, that the UE enters the RRC deactivated state; and a reporting module for reporting to the AMF entity, when the UE enters the RRC deactivated state, that the UE enters the RRC deactivated state, so that the AMF entity reports to the SMF entity that the UE enters the RRC deactivated state.

Figure 8:
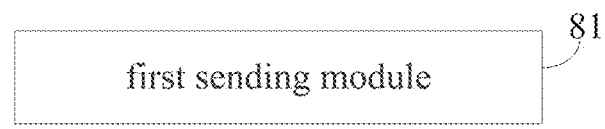
FIG. 8 is a schematic structural view of another paging policy determination device according to the embodiments of the present disclosure.

As shown in FIG. 8, the present disclosure further provide a paging policy determination device applied a core network element, including:

a first sending module 81 for sending the PPI value to the RAN network element;

wherein the PPI value is determined according to the DSCP value of the downlink packet, so that the RAN network element determines the paging policy according to the PPI value when the UE in the RRC deactivated state receives the downlink packet.

According to some embodiments of the present disclosure, the core network elements the SMF entity, the device further includes:

a third receiving module for receiving the DSCP value of the downlink packet sent by the UPF entity; and a second determination module for determining the PPI value according to the DSCP value of the downlink packet.

Optionally, the device further includes:

a second sending module for sending a request message to the UPF entity;

the request message is used to request the UPF entity to send the DSCP value of the downlink packet to the SMF entity.

Optionally, the request message is used to request the UPF entity to determine the DSCP value of the downlink packet and send the DSCP value of the downlink packet to the SMF entity, when the UPF entity detects the downlink packet after the PDU session is established.

According to some embodiments of the present disclosure, the core network element is the SMF entity; the device further includes:

a fourth receiving module for receiving the PPI value sent by the UPF entity;

wherein the PPI value is determined by the UPF entity according to the DSCP value of the downlink packet.

Optionally, the first sending module 81 is configured to send the PPI value to the RAN network element through the AMF entity.

Optionally, the first sending module 81 is configured to send N2 SM information to the AMF entity, so that the AMF entity forwards the N2 SM information to the RAN network element, wherein the N2 SM information includes the PPI value.

Optionally, the first sending module 81 is configured to send the N11 message to the AMF entity;

wherein the N11 message includes the PPI value, such that the AMF entity sends the PPI value to the RAN network element through the N2 message.

According to some embodiments of the present disclosure, the core network element is an UPF entity, the device further includes:

a fifth receiving module for receiving the PPI value sent by the SMF entity;

wherein the PPI value is determined by the SMF entity according to the DSCP value of the downlink packet received from the UPF entity.

Optionally, the first sending module 81 is configured to add the PPI value into the N3 tunnel header, and send the N3 tunnel header to the RAN network element.

Further, the present disclosure provides a RAN network element, including a memory, a processor and a program stored on the memory and capable of running on the processor, wherein the program, by the processor, performs the steps of the paging policy determination method applied to the RAN network element, and the same technical effect can be achieved. A detailed description thereof is therefore not repeated here.

Figure 9:
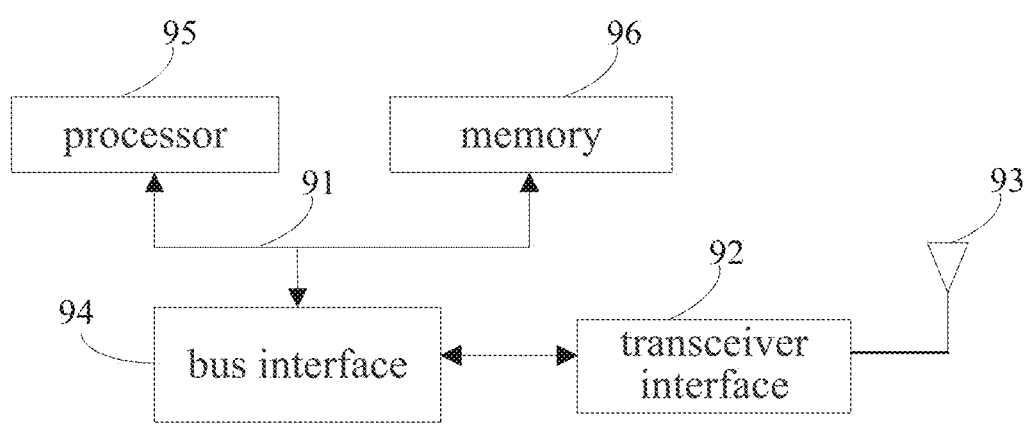
FIG. 9 is another schematic structural view of the RAN network element according to the embodiments of the present disclosure.

As shown in FIG. 9, the RAN network element provided in some embodiments of the present disclosure includes a Bus 91, a transceiver interface 92, an antenna 93, a bus interface 94, a processor 95 and a memory 96.

According to the embodiments of the present disclosure, the RAN network element further includes a program stored on the memory 96 and capable of running on the processor 95, wherein the program, when executed by the processor 95, performs the following steps:

controlling the transceiver interface 92 is configured to receive the PPI value sent by the core network element, wherein the PPI value is determined according to the DSCP value of the downlink packet; and the paging policy is determined according to the PPI value when the UE in the RRC deactivated state receives the downlink packet.

The transceiver interface 92 is configured to receive and send data under control of the processor 95.

In FIG. 9, the bus architecture (represented by Bus 91) may include any number of interconnected buses and bridges. The Bus 91 connects various circuits including one or more processors represented by the processor 95 and memories represented by the memory 96. Bus 91 can also link various circuits, such as peripheral circuits, voltage regulators and power management circuits, which are well known in the art, and therefore will not be repeated herein. The bus interface 94 provides an interface between the Bus 91 and the transceiver interface 92. The transceiver interface 92 may be a single element, or a plurality of elements such as a plurality of receivers and transmitters providing units for communicating with various other devices on a transmission medium. The data processed by the processor 95 is transmitted on the wireless medium through the antenna 93, and the antenna 93 further receives data and transmits the data to the processor 95.

The processor 95 is configured for managing the Bus 91 and normal processing, and also providing a variety of functions including timing, peripheral interface, voltage regulation, power management and other control functions. The memory 96 may be used to store data for performing the operations by the processor 95.

Optionally, the processor 95 may be CPU, ASIC, FPGA or CPLD.

In an eighth aspect, the present disclosure provides a core network element, including a memory, a processor and a program stored on the memory and capable of running on the processor, wherein the program, when executed by the processor, performs the steps of the paging policy determination method applied to the core network element, and the same technical effect can be achieved. A detailed description thereof is therefore not repeated here.

Figure 10:
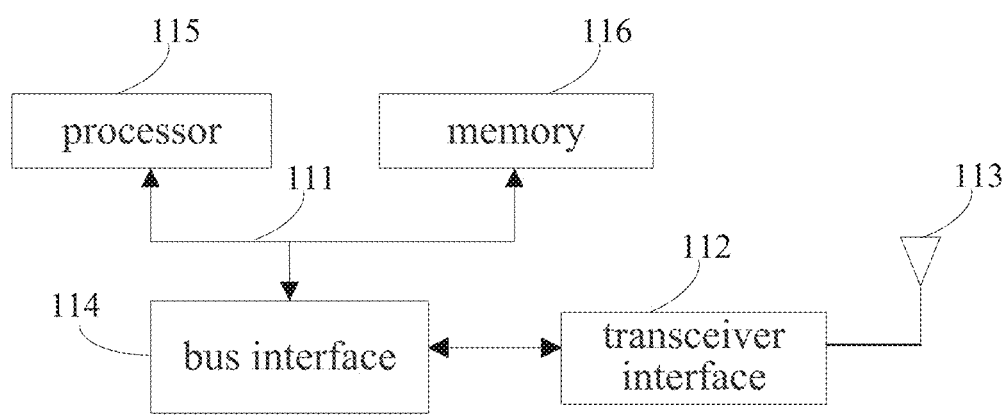
FIG. 10 is another schematic structural view of the core network element according to the embodiments of the present disclosure.

Specifically, as shown in FIG. 10, the RAN network element provided in some embodiments of the present disclosure includes a Bus 111, a transceiver interface 112, an antenna 113, a bus interface 114, a processor 115 and a memory 116.

According to the embodiments of the present disclosure, the RAN network element further includes a program stored on the memory 116 and capable of running on the processor 115, wherein the program, when executed by the processor 115, performs the following steps:

controlling the transceiver interface 112 to send the PPI value to the RAN network element, wherein the PPI value is determined according to the DSCP value of the downlink packet; and the paging policy is determined according to the PPI value when the UE in the RRC deactivated state receives the downlink packet.

The transceiver interface 112 is configured to receive and send data under control of the processor 115.

In FIG. 10, the bus architecture (represented by Bus 111) may include any number of interconnected buses and bridges. The Bus 111 connects various circuits including one or more processors represented by the processor 115 and memories represented by the memory 116. Bus 111 can also link various circuits, such as peripheral circuits, voltage regulators and power management circuits, which are well known in the art, and therefore will not be repeated herein. The bus interface 114 provides an interface between the Bus 111 and the transceiver interface 112. The transceiver interface 112 may be a single element, or a plurality of elements such as a plurality of receivers and transmitters providing units for communicating with various other devices on a transmission medium. The data processed by the processor 115 is transmitted on the wireless medium through the antenna 113, and the antenna 113 further receives data and transmits the data to the processor 115.

The processor 115 is configured for managing the Bus 111 and normal processing, and also providing a variety of functions including timing, peripheral interface, voltage regulation, power management and other control functions. The memory 116 may be used to store data for performing the operations by the processor 115.

Optionally, the processor 115 may be CPU, ASIC, FPGA or CPLD.

Further, the present disclosure provides a computer readable storage medium, wherein the computer readable storage medium stores thereon a computer program which, when executed by a processor, perform the steps of the paging policy determination method applied to the RAN network element, and the same technical effect can be achieved. A detailed description thereof is therefore not repeated here.

Further, the present disclosure provides a computer readable storage medium, wherein the computer readable storage medium stores thereon a computer program which, when executed by a processor, perform the steps of the paging policy determination method applied to the core network element, and the same technical effect can be achieved. A detailed description thereof is therefore not repeated here.

Computer readable media includes permanent and non-permanent, removable and non-removable media, and information storage can be realized by any method or technology. The information can be computer-readable instructions, data structures, modules of program or other data. Examples of computer storage media may include, but not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only optical disk read-only memory (CD-ROM), digital versatile disc (DVD) or other optical storage, magnetic cassette tape, magnetic tape magnetic disk storage or other magnetic storage device, or any other non-transmission medium that can be used to store information to be accessed by a computing device. According to the definition in the present disclosure, the above-mentioned computer readable media does not include computer-readable transitory media, such as modulated data signals and carriers.

It should be noted that in the present disclosure, the terms "include", "contain", or any other variation thereof are intended to denote a non-exclusive inclusion, so that a process, method, article, or device that includes a series of elements may not only include those elements, but also other elements that are not explicitly listed, or elements inherent included in such a process, method, article or device. In the absence of more restrictions, an element defined by the statement "includes a . . . " does not preclude the existence of other identical elements in the process, method, article, or device that includes that element.

The serial number of the embodiments disclosed above is provided for clarity of description and does not imply the advantages and disadvantages of the embodiments.

Through the description of the above embodiments, those skilled in the art can clearly understand that the above embodiment methods can be realized by means of software and necessary general hardware platform, or by hardware, but in many cases the former is a better implementation. In this case, the technical solution of the present disclosure, or the part that contributes to the prior art, can be presented in the form of a software product which can be stored in a storage medium (such as ROM/RAM, magnetic disk, CD) and includes several instructions to enable a terminal device (mobile phone, computer, server, air conditioner or network devices, etc.) to perform the methods described in various embodiments of the present disclosure.

The above is only some specific implementations of the present disclosure, but the protection scope of the present disclosure is not limited hereto. It should be appreciated that modifications and replacements may be made within the technical scope of the present disclosure by those skilled in the art. The protective scope of the present disclosure is defined by the claims.

What is claimed is:

1. A paging policy determination method applied to a RAN network element, the method comprising:
   receiving a Paging Policy Indication (PPI) value sent by a core network element, wherein the PPI value is determined according to a Differentiated Services Code Point (DSCP) value of the downlink packet;
   determining the paging policy according to the PPI value when the UE in the RRC deactivated state receives the downlink packet;
   wherein prior to receiving the PPI value sent by a core network element, the method further comprises:
   receiving a request message sent by the AMF entity, wherein the request message is used to request the RAN network element to report to the AMF entity, when the UE enters the RRC deactivated state, that the UE enters the RRC deactivated state; and
   reporting to the AMF entity that the UE enters the RRC deactivated state when the UE enters the RRC deactivated state, such that the AMF entity reports to the SMF entity that the UE enters the RRC deactivated state.

2. The method according to claim 1, wherein receiving a PPI value sent by a core network element, comprises:
   receiving a PPI value sent by a Session Management Function (SMF) entity;
   wherein the PPI value is determined by the SMF entity according to the DSCP value of the downlink packet received from a User Plane Function (UPF) entity.

3. The method according to claim 2, wherein the DSCP value is sent by the UPF entity to the SMF entity after receiving a request message sent by the SMF entity.

4. The method according to claim 3, wherein the request message is used to request the UPF entity to determine the DSCP value of the downlink packet and send the DSCP value of the downlink packet to the SMF entity, when the UPF entity detects the downlink packet after a Packet Data Unit (PDU) session is established.

5. The method according to claim 1, wherein receiving the PPI value sent by a core network element, comprises:
   receiving a PPI value sent by the SMF entity;
   wherein the PPI value is determined by the UPF entity according to the DSCP value of the downlink packet and sent to the SMF entity.

6. The method according to claim 2, wherein receiving the PPI value sent by the SMF entity, comprises:
   receiving the PPI value sent by the SMF entity through a Mobility Management Function (AMF) entity.

7. The method according to claim 1, wherein receiving the PPI value sent by a core network element, comprises:
   receiving the PPI value sent by the UPF entity,
   wherein the PPI value is determined by the UPF entity according to the DSCP value of the downlink packet, or the PPI value is determined by the SMF entity according to the DSCP value of the downlink packet received from the UPF entity and then sent to the UPF entity.

8. The method according to claim 7, wherein receiving the PPI value sent by the UPF entity, comprises:
   receive a N3 tunnel header sent by the UPF entity, wherein the PPI value is comprised in the N3 tunnel header.

9. A RAN network element, comprising a memory, a processor and a program stored on the memory and capable of running on the processor, wherein the program, when executed by the processor, performs the steps of the paging policy determination method according to claim 1.

10. A computer readable storage medium, wherein the computer readable storage medium stores thereon a computer program which, when executed by a processor, perform the steps of the paging policy determination method according to claim 1.

11. A paging policy determination method applied to a core network element, comprising:

sending a Paging Policy Indication (PPI) value to the RAN network element;

wherein the PPI value is determined according to a Differentiated Services Code Point (DSCP) value of the downlink packet, so that the RAN network element determines the paging policy according to the PPI value when the UE in the RRC deactivated state receives the downlink packet;

wherein the core network element is an UPF entity, and prior to sending the PPI value to the RAN network element, the method further comprises:

receiving a PPI value sent by the SMF entity;

wherein the PPI value is determined by the SMF entity according to the DSCP value of the downlink packet received from the UPF entity;

wherein sending the PPI value to the RAN network element, comprises:

adding the PPI value into the N3 tunnel header; and sending the N3 tunnel header to the RAN network element.

12. The method according to claim 11, wherein the core network element is a Session Management Function (SMF) entity, and prior to sending the PPI value to the RAN network element, the method further comprises:

receiving the DSCP value of the downlink packet sent by the UPF entity; and determining the PPI value according to the DSCP value of the downlink packet.

13. The method according to claim 12, wherein prior to receiving the DSCP value of the downlink packet sent by the UPF entity, the method further comprises:

sending a request message to the UPF entity;

wherein the request message is used to request the UPF entity to send the DSCP value of the downlink packet to the SMF entity.

14. The method according to claim 13, wherein the request message is used to request the UPF entity to determine the DSCP value of the downlink packet and send the DSCP value of the downlink packet to the SMF entity, when the UPF entity detects the downlink packet after the PDU session is established.

15. The method according to claim 11, wherein the core network element is a Session Management Function (SMF) entity, and prior to sending the PPI value to the RAN network element, the method further comprises:

receiving a PPI value sent by the SMF entity;

wherein the PPI value is determined by the UPF entity according to the DSCP value of the downlink packet.

16. The method according to claim 12, wherein sending the PPI value to the RAN network element comprises:

sending the PPI value to the RAN network element through the AMF entity.

17. A RAN network element, comprising a memory, a processor and a program stored on the memory and capable of running on the processor, wherein the program, when executed by the processor, performs the steps of the paging policy determination method according to claim 11.

18. A RAN network element, comprising a transceiver interface, a memory, a processor and a program stored on the memory and capable of running on the processor; wherein, the transceiver interface is configured to receive a PPI value sent by a core network element, wherein the PPI value is determined according to the DSCP value of the downlink packet;

the processor is configured to determine the paging policy according to the PPI value when the UE in the RRC deactivated state receives the downlink packet.

* * * * *